United States Patent [19]

Bailey

[11] Patent Number: 4,499,819

[45] Date of Patent: Feb. 19, 1985

[54] STEAMER

[76] Inventor: Julian C. Bailey, 107 S. Cecil St., Lexington, N.C. 27292

[21] Appl. No.: 502,738

[22] Filed: Jun. 9, 1983

[51] Int. Cl.³ .............................................. A47J 36/24
[52] U.S. Cl. ....................................... 99/483; 99/487; 99/516
[58] Field of Search ................. 99/483, 516, 532, 419, 99/467, 450, 472, 473, 474; 126/369, 369.1–369.3; 219/401; 34/237, 238; 220/298; 137/15

[56] References Cited

U.S. PATENT DOCUMENTS 3,873,753  3/1975  Nelson et al. ................... 99/484 X
3,889,582  6/1975  Binks et al. ..................... 99/516 X Primary Examiner—Timothy F. Simone

[57] ABSTRACT

This invention is a steamer for restaurants, used for steaming bread or rolls; including a case with hinged cover, a tray in the case, upon which the food is placed, and water directly from a public water supply delivered to an electric heating element for being turned to steam; the water supply and electric current to the heating element being controlled from a single push button.

1 Claim, 5 Drawing Figures

U.S. Patent   Feb. 19, 1985   4,499,819
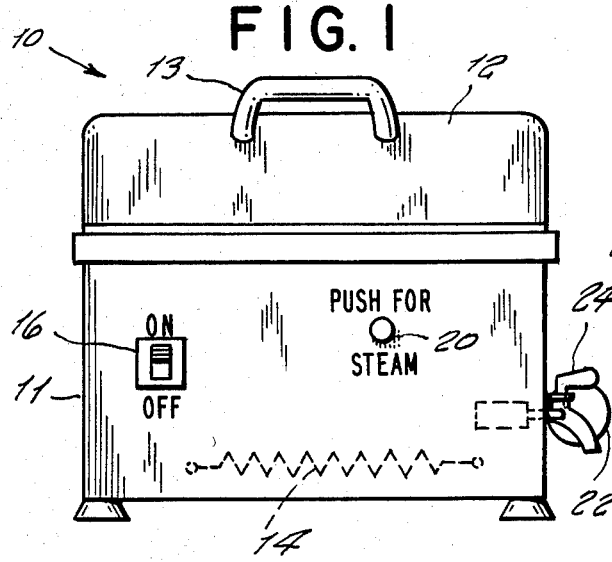
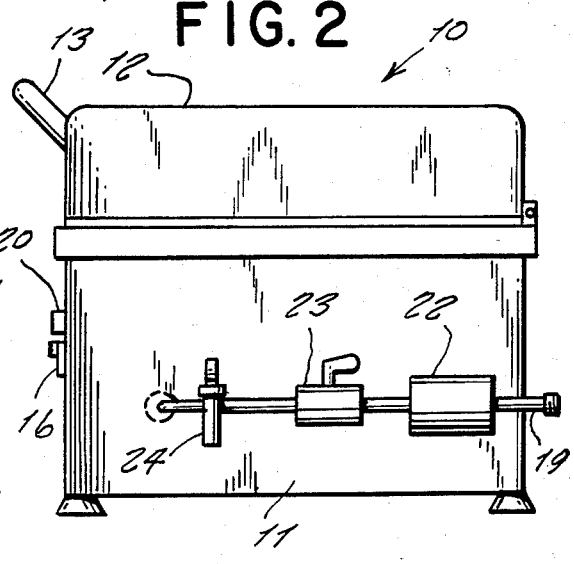
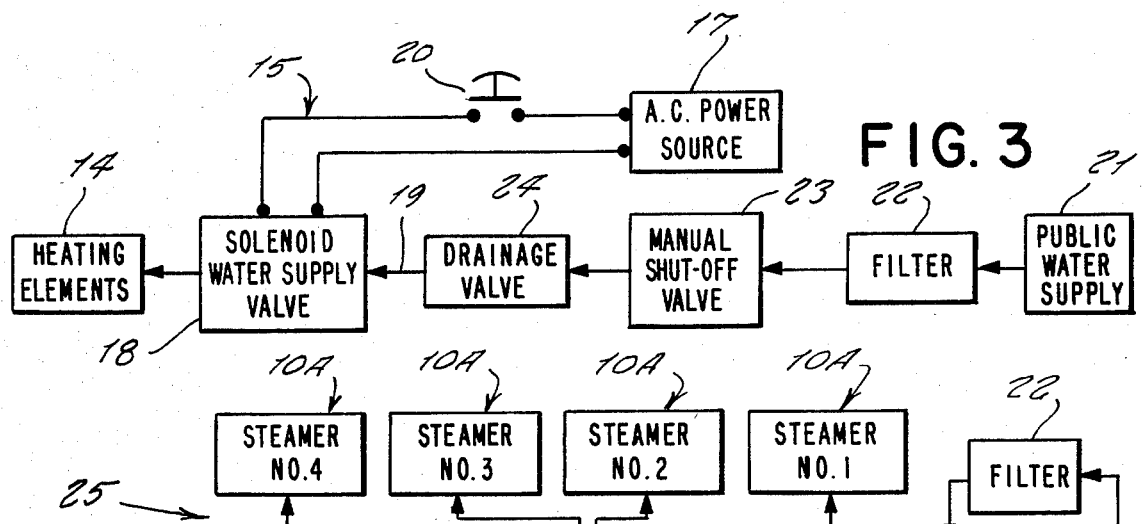
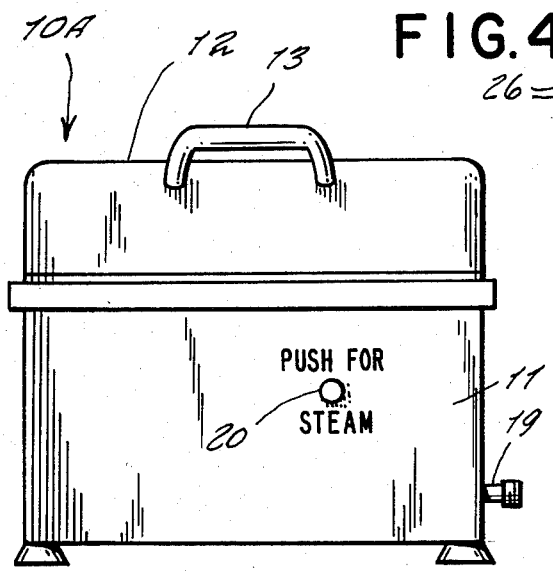
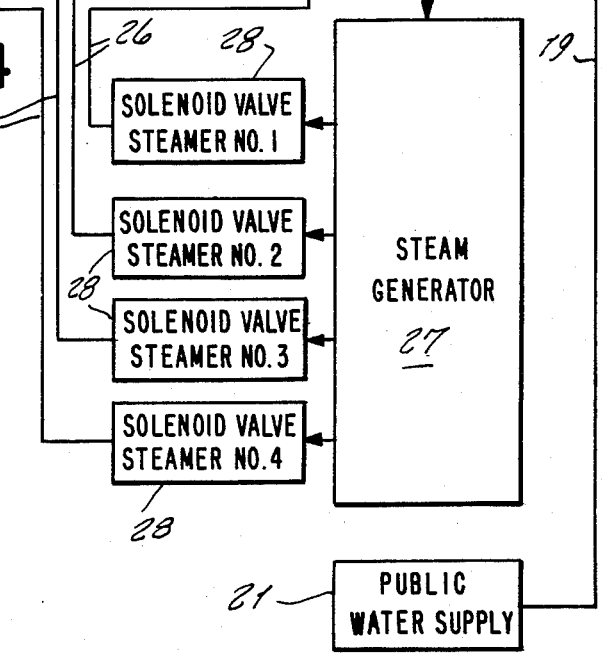

STEAMER

This invention relates generally to restaurant food steamers. More specifically, it relates to steamers used particularly for bread and rolls, and which are now being manufactured for the restaurant trade by Lincoln Manufacturing Company, Incorporated.

It is well known to those persons who are aquainted with the above-mentioned steamer, that it is made with a water tank for supplying the steam, and which must be manually refilled, periodically, as the water is used up. This can be especially objectionable if the water tank becomes empty during busy restaurant hours, when the restaurant personnel is trying to fill out customers' orders as rapidly as they can, without the additional chore of stopping this, in order to refill the steamer water tank. This situation is, accordingly, in need of an improvement.

Therefore, it is a principal object of the present invention to provide a modified design of the above indicated steamer, that is an improvement thereof, by being attached directly to a water supply line, instead of incorporating a refillable tank, so that it never runs out of a water supply.

Another object is to provide an improved steamer, that utilizes the normal water pressure of the water supply line for moving the water directly toward the electric heating elements, so as to eliminate the extra chore of a person to operate a pump handle for pumping a small quantity of water from the tank to the heating element.

Other objects are to provide an improved steamer, which is simple in design, inexpensive to manufacture, rugged in construction, easy to use, and efficient in operation.

These, and other objects, will be readily evident, upon a study of the following specification, and the accompanying drawing, wherein:

FIG. 1 is a front elevational view of the embodiment of the invention;

FIG. 2 is a side elevational view of the embodiment of the invention, taken from the right side of FIG. 1;

FIG. 3 is a block diagram, illustrating the steamer connected to a public water supply and apparatus, making up the embodiment of the invention;

FIG. 4 is a second embodiment of the invention, to be used with a multiple of steamers, having a central steam source, instead of individual heat elements in each steamer. This system could be useful in larger restaurants, or in hospitals, where steamers are in constant use in sterilization of instruments, or where a multiple of steamers are called for, and FIG. 5 is a front elevational view of a typical steamer in its simple design, that would be used in the FIG. 4 embodiment.

Referring now to the drawing in greater detail, and more particularly to FIGS. 1 and 3 thereof at this time, the reference numeral 10 represents a modified or improved steamer, according to the present invention, wherein there is a steamer case 11, that is accessible by an opening on its top, and which is closable by a top cover 12, pivotable about a hinge when lowered by a handle 13. The case contains the conventional tray (not shown), upon which bread or rolls are placed for being steamed. The case includes a conventional heating element 14, in an electrical circuit 15 with a main toggle switch 16, for being powered from an A.C. power source 17. The circuit also includes a solenoid 18, which opens a valve along a water supply line 19, for allowing a preset quantity of water to be delivered to the heating element, each time, when a push button switch 20 of the circuit is depressed.

The water supply line 19 is attachable to a line from a public water supply 21, and extends through a filter 22 toward the solenoid valve; the line 19 being intercepted drainage valve 24.

In operative use, in order to steam an order of bread or rolls, all that is necessary to do is simply to lift the cover, so as to place the food on the tray, and then depress the push button 16. Automatically, a quantity of water is delivered to the heating elements, and the heat goes on. This differs from the conventional model, now used in restaurants, wherein the operator must additionally push a pump handle, for activating a pump, in order to deliver water from a water supply tank to the heating elements, and periodically, need to refill the tank.

In another design 25 of the invention, shown in FIGS. 4 and 5, a plurality of the improved steamers 10A all obtain steam from a single central steam source, so that no heating elements are needed in any one of the steamers, so as to be ideal for use in larger restaurant establishments, or in hospitals wherein such steamers may be in heavy use of sterilizing instruments and the like. In this design, a steam line 26 to each steamer extends from a steam generator 27; each line being intercepted by a solenoid valve 28, operated from a push button 20 on the steamer. A water supply line 19, from a public water supply 21, extends through a filter 22, the same as described above, and to the steam generator. It is understood that the diagram of FIG. 4 includes push button means 20, the same as in FIG. 3, in order to activate a water supply to the steam generator, and electrical supply to the heater elements thereof, as well as control the solenoid valves along the steam lines to the steamers.

While various changes may be made in the detail construction, it is understood that such changes will be within the spirit and scope of the present invention, as is defined by the appended claims.

What I claim as new, is:

1. An improved steamer assembly, comprising, in combination, a plurality of individual steamers, each one of which comprises a case and a cover mounted upon the top of said case by means of a hinge, so as to receive food or other articles for being steamed, and a means for steam admitted into said steamer; a steam source therefor comprising a water supply line, said water supply line being intercepted by a filter and being connected to a single steam generator; and said means comprising a plurality of steam lines from said steam generator being connected to said plurality of steamers, each of said steam lines being intercepted by a solenoid valve in an electrical circuit with an electrical power source and a manually operated push button means on each of said steamers for selectively controlling the steam from said steam generator to said steamers.

* * * * *